United States Patent [19]

Bilson

[11] 4,076,605
[45] Feb. 28, 1978

[54] DICHROMATE LEACH OF COPPER ANODE SLIMES

[75] Inventor: Edward A. Bilson, Inspiration, Ariz.

[73] Assignee: Inspiration Consolidated Copper Company, Morristown, N.J.

[21] Appl. No.: 717,910

[22] Filed: Aug. 26, 1976

[51] Int. Cl.$^2$ .......................... C25C 1/12; C22B 7/00
[52] U.S. Cl. ........................................ 204/108; 75/99; 75/109; 75/117; 204/106
[58] Field of Search ................... 204/108, 106; 75/99, 75/117, 109

[56] References Cited

U.S. PATENT DOCUMENTS

| | | | |
|---|---|---|---|
| 2,039,256 | 4/1936 | Martin et al. ............................. | 75/99 |
| 2,084,394 | 6/1937 | Heberlein ................................. | 75/99 |
| 3,271,279 | 9/1966 | Poor ........................................ | 204/108 |
| 3,730,860 | 5/1973 | Horton et al. .......................... | 204/108 |
| 3,824,160 | 7/1974 | Hartford ................................. | 204/89 |
| 3,914,375 | 10/1975 | Clark et al. ............................. | 204/108 |
| 3,959,097 | 5/1976 | Queneau et al. ...................... | 204/108 |

*Primary Examiner*—T. M. Tufariello
*Attorney, Agent, or Firm*—Pennie & Edmonds

[57] ABSTRACT

This invention relates to a process for the recovery of metal values from copper refinery anode slimes composed largely of copper, selenium, insolubles, and precious metals, including silver, comprising leaching the slimes with a solution containing from 20 to 200 g/l $H_2SO_4$ and from 2 to 25 g/l hexavalent chromium at a temperature not exceeding about 80° C., whereby copper dissolution is maximized and selenium and silver dissolution are minimized, separating the leach solution from the undissolved slimes residue, precipitating selenium from the separated leach solution by treatment with metallic copper, and electrowinning copper from the resulting purified solution.

8 Claims, 2 Drawing Figures

DICHROMATE LEACH OF COPPER ANODE SLIMES

BACKGROUND OF THE INVENTION

Electrolytic refining of copper results in the formation of an anode mud or slime which will range anywhere from about 0.5 to 3% or more of the original anode weight. The composition of the slime will vary dependent upon the components of the anodes which are not soluble in electrolyte. The slimes themselves are of fine particle size, about −200 mesh, and ordinarily grayish-black in color. Slimes usually contain varying quantities of copper, silver, gold, sulfur, selenium, tellurium, antimony, arsenic, nickel, iron, silica, bismuth, and the like. Ordinarily, the largest component of the slimes is copper, which ranges from about 15 to 30% by weight, or more, of the slime. In addition to the valuable copper present in the slimes, there is a significant amount of precious metals, such as silver and gold, as well as other metals which are of economic value, such as selenium and tellurium.

Because of the large amounts of copper in the slime as well as of the precious metals and other valuable metals, a variety of techniques have been utilized to recover such metals for the slime. None, however, have been commercially successful because of the large cost involved and the fact that it is difficult to recover the precious metals from the slime. One type of technique involves direct smelting of slimes. This is disadvantageous since excessive formation of matte and slag cause heavy recirculation of precious metals, especially of silver. Such techniques involve roasting to convert copper to copper oxide followed by leaching of the roasted slimes with sulfuric acid. The leached slimes are then melted down in a small reverberatory (dore) furnace in which the impurities are oxidized and to leave a dore bullion of the precious metals silver and gold. The dore is then parted to recover the fine gold, fine silver, and any other precious metal present in the original slime. This particular technique is, as noted, unsuitable because of the excessive formation of matte and slag.

A variety of other pyrometallurgical techniques combined with acid leaches and acid leach procedures have also been attempted, but they equally are not suitable mainly because it has not been possible to initially remove substantially all of the copper from the slime. It has been found that copper levels at or above about 5% by weight of the material to be treated greatly inhibit the known procedures for recovery of selenium and precious metals, particularly silver, from slime.

In addition, in leaching slimes with an acid, even strong sulfuric acid leach solutions (400 g/l), a leach time under agitation of up to 72 hours is required. Also, during such leach, it is necessary to periodically stop the agitation, heat, and aeration to permit the solids to settle and then to decant the clear solution. After decantation, additional leach solution (water and acid) is added and heat, air, and agitation started to continue the leach.

As a consequence, it has heretofore been costly in terms of material, labor, maintenance, and time to recover the copper, precious metals, and other metal values from copper anode slimes.

SUMMARY OF THE INVENTION

The present invention provides a process for the recovery of metal values from copper anode slimes in a rapid, convenient, and economical manner, and, in its preferred embodiment, provides a complete hydrometallurgical process for processing slimes through the recovery of most of the metal values.

Briefly stated, the present invention comprises a process for the recovery of metal values from copper refinery anode slimes composed largely of copper, selenium, insolubles, and precious metals, including silver, comprising leaching the slimes with a solution containing from 20 to 200 g/l $H_2SO_4$ and from 2 to 25 g/l hexavalent chromium at a temperature not exceeding about 80° C. whereby copper dissolution is maximized and selenium and silver dissolution are minimized, separating the leach solution from the undissolved slimes residue, precipitating selenium from the separated leach solution by treatment with metallic copper, and electrowinning copper from the resulting purified solution.

DETRAILED DESCRIPTION

The process of the instant invention can be utilized for recovery of metal values from any type of anode mud or slime produced in electrolytic refining of copper. It is recognized that the average composition range of such slimes will vary widely dependent, in part, upon the copper material being refined and the refining procedures used. While the instant invention, as hereinafter described in detail, is applicable to all such slimes, the optimum processing parameters for any particular slime can be determined by making test runs based on the particular metal composition of such slimes. Thus, for example, the initial leaching of a slime to recover the copper, as discussed below, need be for a shorter period of time for those slimes containing low amounts of copper and, correspondingly a longer leach time for those slimes containing high amounts of copper. In brief, the essence of the present invention is such that it can be carried out by those skilled in this art working within the process parameters set forth herein, it being understood that, for each particular slime composition, there may have to be some adjustment made within the parameters noted for the optimum recovery of metal values.

Figure 1:
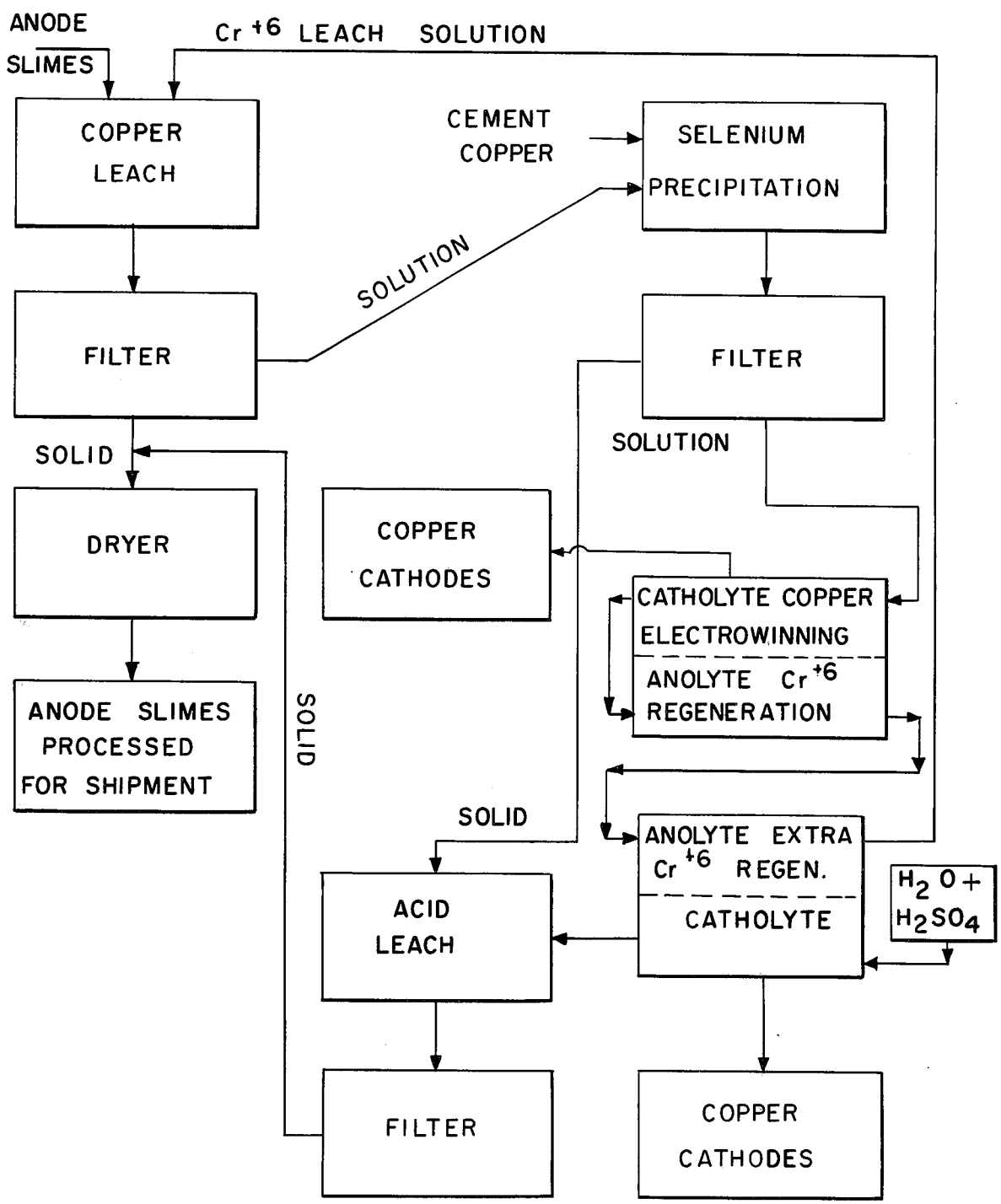
FIG. 1 is a flow sheet of the process according to the invention.
Figure 2:
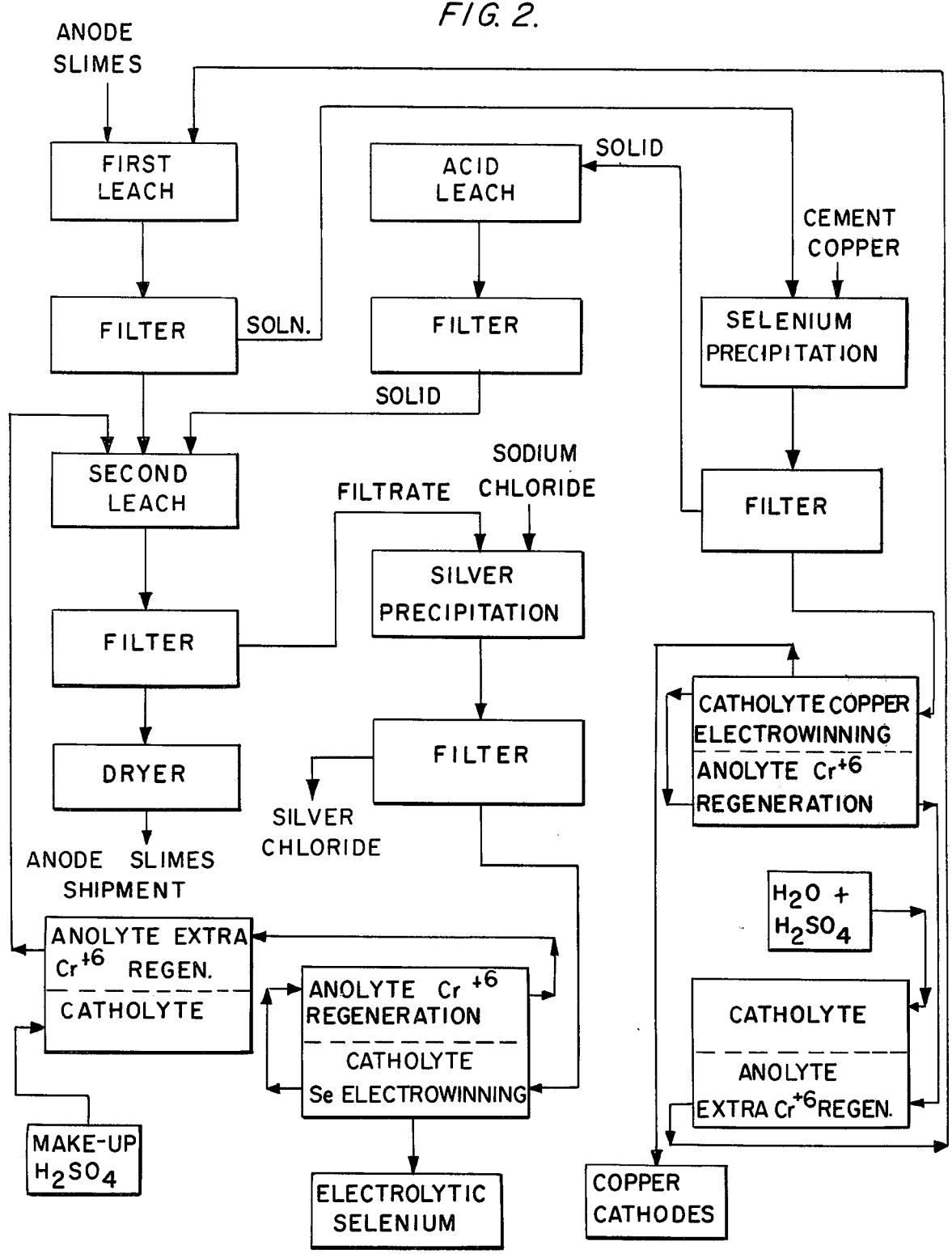
FIG. 2 is a flow sheet of an alternate embodiment of the invention.

The process of the instant invention will be described with reference to the accompanying flow sheets. Referring to FIGS. 1 and 2, the initial step in the process is the leaching of the slimes which can be carried out as a batch or continuous leach. It is preferred to leach in a continuous concurrent circuit consisting of three or four tanks or vats. If a continuous circuit is used, the slimes can be added to the leach vats or tanks as is, but preferably they are first filtered to reduce the amount of water if regeneration of hexavalent chromate is desired. It is necessary to minimize the amount of water in the slimes even to the point of drying the same prior to addition to the leach tanks.

Leaching is effected under agitation in any conventional leaching vessel with an aqueous acidic solution containing from about 20 to 200 grams per liter (g/l) $H_2SO_4$ and from 2 to 25 g/l hexavalent chromium. The particular amounts of acid and chromium used depends upon the concentration of metals in the slime being processed. For conventional slimes, amounts within the ranges noted are adequate for an effective leach.

The particular chromium compound used may be any hexavalent chromium compound soluble in the aqueous acid leach solution. Examples are chromic acid, magnesium chromate, sodium dichromate, mixtures thereof, and the like.

It is desirable to maintain a temperature of about 75° C. through the leach and preferably to not exceed a temperature of about 80° C. and the leach is carried out for a time sufficient to leach substantially all of the copper from the slimes; that is, to leave a copper content of, preferably, no more than about 3% based on the weight of the slimes. Ordinarily, this will take a total leach time of between 1 to 3 hours, again, the particular time dependent upon the slime treated.

After leaching is completed, the leach solution is separated from the undissolved slimes. This can be accomplished by any conventional technique, preferably by filtration. The leach slurry can be thickened prior to filtration or filtered directly from the leach. The solids are dried and processed for shipment to plants for recovery of the precious metals and other metal values. Because the copper has been removed, the dried, processed anode slimes are acceptable for treatment in selenium, silver, and the like, recovery plants. The resultant clarified or filtered solution is purified by removal of the selenium, preferably by the addition of relatively pure cement copper to the solution. This purification can be carried out in batch or continuously in a co-current operation. The reaction is carried out for a time sufficient to insure precipitation of all of the selenium and, if present, tellurium from the solution. Ordinarily, such clarification or purification of the solution can be accomplished within about 1 hour at a temperature of the boiling point of the solution.

The slurry from this purification step is filtered with the solution then being conveyed to a conventional diaphragm cell wherein the copper is recovered in the cathode compartments and the hexavalent chromium regenerated by passing the solution through the anode compartments of the same diaphragm cell in which the copper electrowinning is effected. The solids containing the previously dissolved selenium, any tellurium, and copper then are processed by a conventional sulfuric acid, heat, air leaching to dissolve the copper and any tellurium present. The concentration of acid, leach time, leach temperature, and the like are those conventionally utilized for such purpose. After filtration, the solution is subjected to copper electrowinning in any conventional diaphragm cell. The copper is recovered in the cathode compartments of the cell and, at the same time, the hexavalent chromium can be regenerated by passing the solution through the anode compartments of the same diaphragm cell that the electrowinning took place. The conditions of such copper electrowinning and $Cr^{+6}$ regeneration and of the first electrowinning are those conventionally used to electrowin copper and regenerate the hexavalent chromium. Generally, sufficient $Cr^{+6}$ will be regenerated. However, in cases where the chromium consumption greatly exceeds the theoretical $Cr^{+6}$ requirements, extra $Cr^{+6}$ cells may be required.

The solids resulting from filtration of the acid leach are dried and included with the processed anode slimes which are to be treated for recocvery of the precious metals and other metals. Such processed slimes contain less than about 5% by weight, and, most preferably, less than 3% by weight of copper.

In the embodiment of the invention depicted in FIG. 2, there is again production of electrolytic copper and regeneration of hexavalent chromium, but, in this case, the process also contemplates recovery of the selenium and silver contained in the raw slimes. The tails resulting in this process and indicated in the flow diagram as "anode slimes shipment" would contain other precious metals, such as gold or platinum, and other metal values, which tails can be processed by usual techniques to recover such metals.

Broadly, the instant embodiment involves two leaches with different $Cr^{+6}$ acidic leach solutions. Further, a major distinction in the present embodiment is the fact that, although the leaching is carried out utilizing aqueous sulfuric acid and hexavalent chromium, as discussed above, it is carried out at a much higher temperature; namely, the first leach is at the boiling point of the solution with the copper being reduced to a point as low as practical (about 0.2 to 0.5% by weight of the slimes). The leach conditions, such as g/l of acid and $Cr^{+6}$ and time, are as otherwise previously described. Due to the increased temperature, more selenium is dissolved.

Preferably, this leach is carried out for 2 hours and, as previously discussed, the leach slurry can be thickened and filtered or fed directly to filtration. Selenium precipitation with cement copper, the subsequent filtration, bifluid cell electrowinning, and the acid leach are all carried out as described above. The purification step, when performed at the boiling point of the solution, will remove substantially all of the selenium.

The solids (tail) from the leach of the acid leach is added to the solids (tail) of the first leach and the combined tails are subjected to a second acid-hexavalent chromate leach. There is, however, a major difference between the acidic-chromate leach solution used in the second leach and that employed in the initial, or first, leach. Specifically, the second leach solution must contain at least 350 g/l sulfuric acid. In addition, the second leach is of longer duration. A leach time of up to about 4 hours is used in order to insure dissolution of the silver and selenium. The second leach can be carried out either as a batch leach process or as a continuous co-current leach carried out in agitation leach vessels. As noted, the leach is carried out for about 4 hours, or more, particularly until at least the major portion, 90% and above, of the selenium and silver are dissolved. The slurry is then filtered while still hot to minimize the formation of a complex silver-chromate-selenite product. The solids resulting from the filtration are then dried and prepared for shipment as discussed above.

The hot, but not boiling, filtered solution is treated with sodium chloride to precipitate the silver as silver chloride. The amount of sodium chloride added should be carefully regulated to an amount just above that required stoichiometrically to precipitate the silver. A large excess of chloride is undesirable because of its adverse effect on $Cr^{+6}$ regeneration. The silver chloride slurry is cooled and the silver chloride filtered from the solution. The separated silver chloride can now be treated by any of the known procedures applicable thereto to produce elemental silver.

After removal of the silver chloride, the solution is subjected to bifluid electrolysis to recover the elemental selenium, and, at the same time, to regenerate the $Cr^{+6}$. More specifically, the solution is subjected to cathode compartment electrowinning utilizing a titanium cathode in order to produce elemental selenium of the highest possible grade. After the selenium has been recovered from the solution, the solution is then subjected to $Cr^{+6}$ regeneration in the anode compartments of the same cells.

Extra regeneration may be needed, and this can be accomplished in additional diaphragm cells which produce hydrogen at the cathodes. Additional $H_2SO_4$, if required, can be added to the cathode compartments.

Thus, the original copper anode slimes have now had the copper, selenium, and silver removed and can be treated for removal of other precious metals, such as gold and platinum, by any of the known procedures.

Thus, the process of the instant invention, in its broadest aspect, comprises removal of copper from the copper anode slimes to a level below that at which the copper can interfere with recovery of selenium, silver, and other metals therein. In its more preferred embodiment, a complete hydrometallurgical process is set forth for recovery from the anode slimes of not only the copper, but also of the selenium and silver. This is accomplished in an economical manner not requiring leaches of 24 hours or longer and, at the same time, avoiding the cost and problems inherent in the use of pyrometallurgical techniques.

The following examples are given to illustrate the best modes for carrying out the present invention, but are not to be construed as restricting the scope thereof.

EXAMPLE 1

When leaching the slimes in a continuous circuit with provisions for electrolytic recovery of copper and regeneration of $Cr^{+6}$, a water balance must be taken into consideration. Thus, the slimes fed to the leach should, at least, be filtered, and, better yet, be dried prior to addition to the leach.

The slimes will be added to the leach at a constant rate which will allow a total leach time of between 1 and 3 hours.

In order to minimize the dissolution of selenium, the $Cr^{+6}$ solution used to leach the slimes is added to all but the last leach tank. Thus, in a four-tank, continuous circuit, one-half of the leach solution could be added to the first tank, one-third to the second tank, and one-sixth to the third tank. The fourth tank will allow the dissolution of copper to go to completion.

It is desirable to maintain a temperature of 75° C. throughout the leach. Thus, a small amount of heat may be needed in the latter stages of the leach, say tanks 3 and 4.

The solution fed to the leach could have the following analyses:

| Cu | 25 gpl | Te | 0.2 gpl |
|---|---|---|---|
| Cr | 40 | As | .02 |
| $Cr^{+6}$ | 20 | Sb | .02 |
| $H_2SO_4$ | 150 | Bi | .02 |
| Se | .05 | Fe | .1 |
| | | Ag | Tr |

The slurry from the leach can be thickened prior to filtration or filtered directly from the leach. In either case, the solids are washed, dried and prepared for sale. The solids will have substantially the following analysis:

| Cu | 4.0% | CaO | 2% |
|---|---|---|---|

-continued

| Se | 35.0% | Pb | 1.5% |
|---|---|---|---|
| Ag | 6000 oz/ton | S | 3.0% |
| Au | 65 oz/ton | Co | Tr |
| $SiO_2$ | 30% | Te | 0.6% |
| $Al_2O_3$ | 2% | Sb | 0.1% |
| As | 0.1% | Fe | 0.1% |
| | | Zn | 0.1% |

The filtered solution will have the following analysis:

| Cu | 55 gpl | Te | 0.4 gpl |
|---|---|---|---|
| Cr | 40 | As | 0.02 |
| $Cr^{+6}$ | 3 | Ag | Tr |
| $H_2SO_4$ | 20 | Sb | 0.02 |
| Se | 3 | Bi | 0.02 |
| | | Fe | 0.2 |

The clarified, or filtered, solution is purified by the addition of relatively pure cement copper. The purification can be made in a batch step or in a continuous step similar to the leach. The reaction is allowed to continue for 1 hour at a temperature of the boiling point of the solution.

The slurry from the purification step is filtered. The solids which contain the previously dissolved selenium and tellurium can be processed by the conventional sulfuric acid, heat, air leaching to dissolve the copper and tellurium. Thus far, attempts to add the selenium precipitate to a dichromate leach have resulted in total dissolution of selenium and tellurium.

The sulfuric acid leach will dissolve the copper and tellurium, leaving a selenium product that can be sold separately or added to the processed slimes.

Actually the selenium dissolved by the chromic acid leach is less than 10% of the selenium fed to the leach. The copper selenium product produced during the purification of the solution could easily be sent to a smelter to be reprocessed into anodes.

The purified solution is then subjected to copper electrowinning in a diaphragm cell. The solution will have the following analysis:

| Cu | 60 gpl | Te | 0.2 gpl |
|---|---|---|---|
| Cr | 40 | As | .02 |
| $Cr^{+6}$ | 0 | Ag | Tr |
| $H_2SO_4$ | 5 | Sb | .02 |
| | | Bi | .02 |
| | | Fe | .2 |

Currently the copper produced during the electrolysis of the purified solution is not of refined cathode quality. A typical analysis indicates higher than desirable quantities of tellurium, antimony and arsenic. A typical analysis is given below in ppm.

| Ag | < 1.0 | Sn | 1.2 |
|---|---|---|---|
| Fe | < 1.0 | Ni | < 1.0 |
| Se | < 2.6 | Bi | 0.9 |
| Pb | 1.0 | Sb | 15.2 |
| Zn | 3.0 | As | 4.8 |
| | | Te | > 4.6 |

While further purification of the solution may allow the production of refined quality cathode copper, this process is not in any way dependent on the quality of the cathode copper produced during copper electrowinning.

Removal of the desired amount of copper will leave a solution with the following analysis:

| Cu | 25 gpl | $H_2SO_4$ | 50 gpl |
|---|---|---|---|
| Cr | 40 | Se | .01 |
| $Cr^{+6}$ | 0 | Te | 0.1 |

This solution is ready for $Cr^{+6}$ regeneration. This is accomplished by passing the solution through the anode compartments of the same diaphragm cells that the copper electrowinning took place in. Generally, sufficient $Cr^{+6}$ will be regenerated in this operation. However, in cases where the chromium consumption greatly exceeds the theoretical chromium +6 requirements, extra $Cr^{+6}$ regeneration cells will be required. This will generally be accomplished while producing hydrogen at the cathode, but any solution, including the copper solution obtained by leaching the copper selenide produced when purifying the solution before copper electrowinning, can be used.

The regenerated solution will have the following analyses and is ready to leach additional slimes:

| Cu | 25 gpl |
|---|---|
| Cr | 40 |
| $Cr^{+6}$ | 20 |
| $H_2SO_4$ | 150 |

The operation of this process is controlled in such a way that the copper is reduced to a no-penalty level while minimizing the dissolution of selenium. Silver is not dissolved when leaching at 80° C. and a sulfuric acid concentration of 200 gpl.

EXAMPLE 2

This process involves two leaches with separate solutions. The process proceeds utilizing a copper leach with chromic acid solution.

This first leach is similar to the copper leach described in Example 1 in which the leach was continuous and the copper was recovered by electrolysis and the $Cr^{+6}$ regenerated for reuse. The above process produced a leach tail with between 2 and 5% copper. The process described now requires that the copper be reduced to as low as practical, say 0.2 to 0.5%. In order to do this, the leach must be performed at the boiling point of the solution.

Aside from the increased temperature, the copper leach proceeds as previously described. Due to the increased temperature, more selenium is dissolved, up to 20% of the selenium in the raw slimes. The leach will continue for up to 2 hours. The slurry can go to a thickener or be filtered directly from the leach. The filtered and/or the clarified solution is purified with cement copper, and the purified solution subjected to copper electrowinning. The purification step, when performed at the boiling point of the solution, will remove the selenium to a low level.

The solid produced during the purification step contains copper selenides as well as unreacted metallic copper. When this product is leached in a sulfuric acid solution containing between 200 and 300 gpl acid, with air, at a temperature of up to 100° C., the copper is dissolved to a low level, leaving a fairly pure elemental selenium. The tellurium precipitated during the purification step is also dissolved. Little selenium is dissolved.

The tail from the leach of the copper selenide purification product is added to the tail from the first chromic acid leach. As yet, no other method of handling the copper selenide product has been developed. For some reason, the product dissolves completely in chromium acid solutions, even at room temperature.

The combined tails are then subjected to a second chromic acid leach. The solid fed to this leach will have the following analysis:

| Cu | 0.2 | $SiO_2$ | 30 |
|---|---|---|---|
| Se | 32.1 | CaO | 0.8 |
| Te | .14 | $Al_2O_3$ | 2.4 |
| Ag | 6132 | Pb | 1.7 |
| Au | 68.2 | S | 3.8 |

The solution for this leach will have the following analysis:

| Cu | 0.2 gpl |
|---|---|
| Se | 14.0 |
| Cr | 40 |
| $Cr^{+6}$ | 25 |
| $H_2SO_4$ | 350 |
| Te | 0.1 |

The major difference between this solution and the one to dissolve the copper is the sulfuric acid concentration. While 150 to 200 g/l $H_2SO_4$ is satisfactory to dissolve the copper, 350 g/l $H_2SO_4$ is needed to dissolve the silver and selenium. Also, due to the method of recovering the selenium, the copper in solution, and, thus, the copper in a solid feed to the leach, must be kept at a minimum.

The leach, which lasts 4 hours, takes place at the boiling point of the solution. The leach can either be a batch process in which the solids (filtered from the copper leach) are added to all of the solution needed for the leach, or a continuous co-current leach in which all of the solids and all of the solution are added to the first of three or four agitated leach vessels. During the leach, 99% of the selenium and 92% of the silver are dissolved.

The slurry from the leach should be filtered hot, to minimize the formation of a complex silver chromate selenite product. The hot, but not boiling, filtered solution is treated with sodium chloride to precipitate the silver as silver chloride. Excess chloride is undesirable because of its adverse effect on $Cr^{+6}$ regeneration.

The silver chloride slurry is cooled, and the silver chloride filtered from the solution. This silver chloride product is quite pure and is ready for processing to produce elemental silver by known processes. The silver chloride product contains around 92% of the silver in the slimes.

The solution fed to the silver removal step would have the following analysis:

| Cu | 0.4 gpl | $H_2SO_4$ | 250 gpl |
|---|---|---|---|
| Se | 30.0 | Ag | 5.5 |
| Cr | 40 | Te | .2 |
| $Cr^{+6}$ | 3 | | |

After removal of the silver, the solution, which has the following analysis, is subjected to cathode compartment electrowinning to recover elemental selenium.

| Cu | 0.4 gpl | $H_2SO_4$ | 250 gpl |
|---|---|---|---|
| Se | 30 | Ag | Tr |
| Cr | 40 | Cl | Tr |

-continued

| | | | |
|---|---|---|---|
| $Cr^{+6}$ | 3 | Te | 0.2 |

It is recommended that a titanium cathode be used because it produces a higher grade selenium product. The elemental selenium produced has the following analysis.

| | | | |
|---|---|---|---|
| Se | 97.25% | Pb | Tr |
| Cu | 0.8 | $SO_4$ | 0.6% |
| Cr | 0.1 | Te | 0.04 |
| Fe | 0.1 | Ag | 45.80 oz/ton |
| Cl | 0.3 | | |

The selenium product produced during electrowinning is a nonadherent deposit which tends to float to the surface of the cell. Thus, the titanium cathodes need not be pulled to recover the selenium. If the cell flow rare is maintained at a high enough level, the elemental selenium is flushed from the cell to a thickener or directly to filtration.

After sufficient selenium has been removed from the solution, and the particulate selenium removed by filtration, the solution is then subjected to $Cr^{+6}$ regeneration in the anode compartments of the same cells. Extra regeneration is needed and accomplished in additional diaphragm cells which produced hydrogen at the cathodes. The regenerated solution will have the following analysis, and is ready to leach additional slimes.

| | |
|---|---|
| Cu | 0.2 gpl |
| Se | 15.0 |
| Cr | 40.0 |
| $Cr^{+6}$ | 25 |
| $H_2SO_4$ | 350 |
| Te | 0.1 |

During the selenium electrolysis, other elements and compounds are produced which must be removed from the selenium to make a high purity product. This can be accomplished using known methods, such as an inert gas distillation. As soon as sufficient electrolytic selenium is produced, a solvent extraction technique will be tried which is to dissolve the selenium and leave the impurities behind. The solvent would be removed using distillation technique to produce high purity selenium.

The tail from the selenium silver leach would have the following analysis:

| | | | |
|---|---|---|---|
| Ag | 1100 oz/ton | Fe | 0.5% |
| Au | 135 | S | 2.3 |
| Cu | 0.13% | Sb | 0.05 |
| Se | 0.1 | As | Tr |
| $SiO_2$ | 57 | Bi | Tr |
| Te | Tr | Pb | 5. |

This product is ready for precious metals recovery by known methods.

The slimes processed in Examples 1 and 2 had the following analysis:

| | |
|---|---|
| Cu | 34.98% |
| Se | 23.04% |
| Ag | 3412.2 oz/ton |
| Au | 37.0 oz/ton |
| $SiO_2$ | 16.2% |
| $Al_2O_3$ | 1.1% |
| CaO | 1.0% |
| Pb | 0.7% |
| S | 5.5% |

-continued

| | |
|---|---|
| Co | 0.1% |
| Te | 0.5% |
| As | 0.075% |
| Sb | 0.13% |
| Fe | 0.08% |
| Zn | 0.02% |
| Ni | Tr |
| Cr | Tr |
| Bi | Tr |

While the invention has been described in connection with the preferred embodiments, it is not intended to limit the invention to the particular forms set forth, but, on the contrary, it is intended to cover such alternatives, modification, and equivalents as may be included within the spirit and scope of the invention as defined by the appended claims.

What is claimed is:

1. A process for the recovery of metal values from copper refinery anode slimes composed largely of copper, selenium, insolubles, and precious metals including silver comprising leaching the slimes with a solution containing from 20 to 200 g/l $H_2SO_4$ and from 2 to 25 g/l hexavalent chromium at a temperature not exceeding about 80° C., whereby copper dissolution is maximized and selenium and silver dissolution are minimized, separating the leach solution from the undissolved slimes residue, precipitating selenium from the separated leach solution by treatment with metallic copper, and electrowinning copper from the resulting purified solution.

2. The process of claim 1 wherein the purified leach solution is electrolyzed in a bifluid electrolytic cell wherein copper is electrowon from the catholyte and hexavalent chromium is regenerated in the anolyte, and such anolyte is recycled to the leaching operation for leaching a further quantity of slimes.

3. The process of claim 1 wherein the slimes are leached with a solution containing from 20 to 200 g/l $H_2SO_4$ and from 2 to 25 g/l hexavalent chromium at a temperature near 100° C., whereby substantially all the copper and a substantial portion of the selenium are dissolved, precipitating selenium from the separated leach solution as copper selenide by treating said solution with metallic copper, subjecting the purified leach solution to bifluid electrolysis to electrowin copper from the catholyte and regenerate hexavalent chromium in the anolyte, leaching the copper selenide precipitate with a strong aqueous sulfuric acid solution containing 200 to 300 g/l $H_2SO_4$ at a temperature up to 100° C., and recovering the copper and selenium, respectively, from said resulting leach solution and leach residue.

4. The process of claim 3 wherein the residue from the original slimes leach is subjected to a secondary leach with an aqueous solution containing 300 to 400 g/l $H_2SO_4$ and alkali metal dichromate equivalent to 10 to 40 g/l hexavalent chromium at a temperature of about 100° C., whereby substantially all the selenium and a substantial proportion of the silver are dissolved, treating the secondary leach solution, after separation from the secondary leach residue, with a soluble chloride to precipitate the silver, and electrolyzing the resulting silver-free secondary leach solution in a bifluid electrolytic cell to electrowin selenium from the catholyte and to regenerate hexavalent chromium in the anolyte.

5. The process of claim 3 wherein the copper is recovered from the strong, aqueous sulfuric acid leach solution by electrolysis in a bifluid electrolytic cell.

6. The process of claim 3 wherein the residue from the original slimes leach and the residue from the strong aqueous sulfuric acid leach are subjected to a secondary leach with an aqueous solution containing 300 to 400 g/l $H_2SO_4$ and alkali metal dichromate equivalent to 10 to 40 g/l hexavalent chromium at a temperature of about 100° C., whereby substantially all the selenium and a substantial proportion of the silver are dissolved, treating the secondary leach solution, after separation from the secondary leach residue, with a soluble chloride to precipitate the silver, and electrolyzing the resulting silver-free secondary leach solution in a bifluid electrolytic cell to electrowin selenium from the catholyte and to regenerate hexavalent chromium in the anolyte.

7. The process of claim 4 wherein the solution stripped of selenium in a bifluid electrolytic cell is recycled to said secondary leach.

8. The process of claim 6 wherein the solution stripped of selenium in a bifluid electrolytic cell is recycled to said secondary leach.

* * * * *